United States Patent
Kuroi

(10) Patent No.: US 10,860,074 B2
(45) Date of Patent: Dec. 8, 2020

(54) POWER SUPPLY SYSTEM AND SEMICONDUCTOR DEVICE USED FOR THE SAME

(71) Applicant: Renesas Electronics Corporation, Tokyo (JP)

(72) Inventor: Yoshihiro Kuroi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 216 days.

(21) Appl. No.: 16/100,991

(22) Filed: Aug. 10, 2018

(65) Prior Publication Data

US 2019/0138072 A1    May 9, 2019

(30) Foreign Application Priority Data

Nov. 8, 2017    (JP) .................................. 2017-215535

(51) Int. Cl.
| | |
|---|---|
| *H02J 3/14* | (2006.01) |
| *G06F 1/26* | (2006.01) |
| *H02J 5/00* | (2016.01) |
| *G06F 1/30* | (2006.01) |
| *H02J 7/34* | (2006.01) |
| *H02J 7/00* | (2006.01) |

(52) U.S. Cl.
CPC .............. *G06F 1/266* (2013.01); *G06F 1/305* (2013.01); *H02J 5/00* (2013.01); *G06F 2213/0042* (2013.01); *H02J 7/00* (2013.01); *H02J 7/34* (2013.01)

(58) Field of Classification Search
CPC .. G06F 1/266; G06F 1/305; G06F 2213/0042; G06F 1/189; H02J 7/00; H02J 7/34
See application file for complete search history.

(56) References Cited

U.S. PATENT DOCUMENTS

| | | | |
|---|---|---|---|
| 7,406,623 B2* | 7/2008 | Takahashi | H02J 9/061 |
| | | | 713/300 |
| 2016/0105040 A1* | 4/2016 | Chou | H02J 7/00 |
| | | | 320/162 |
| 2016/0336745 A1* | 11/2016 | Pandya | G06F 1/305 |

(Continued)

FOREIGN PATENT DOCUMENTS

JP    2010-244457 A    10/2010

*Primary Examiner* — Rexford N Barnie
*Assistant Examiner* — Rasem Mourad
(74) *Attorney, Agent, or Firm* — McDermott Will & Emery LLP

(57) ABSTRACT

The present disclosure provides a semiconductor device in which shortening of system rise time is achieved. A power supply system conformed to a USBPD standard includes: a plurality of USB ports; a common power supply unit common to the plurality of USB ports; a plurality of power supply units corresponding to the plurality of USB ports, a plurality of controllers corresponding to the plurality of USB ports; and a management unit executing allocation of maximum power to be assigned to the plurality of USB ports in accordance with signals from the plurality of controllers. The management unit determines whether surplus power is generated in maximum power assigned to a first USB port by execution of the allocation of the maximum power and, when surplus power is generated, increases the maximum power assigned to a second USB port.

9 Claims, 8 Drawing Sheets

(56) References Cited

U.S. PATENT DOCUMENTS

| | | | |
|---|---|---|---|
| 2018/0120910 A1* | 5/2018 | Farkas | G06F 1/189 |
| 2018/0131148 A1* | 5/2018 | Liu | H01R 31/02 |
| 2019/0074708 A1* | 3/2019 | Krishnakumar | G06F 1/266 |

* cited by examiner

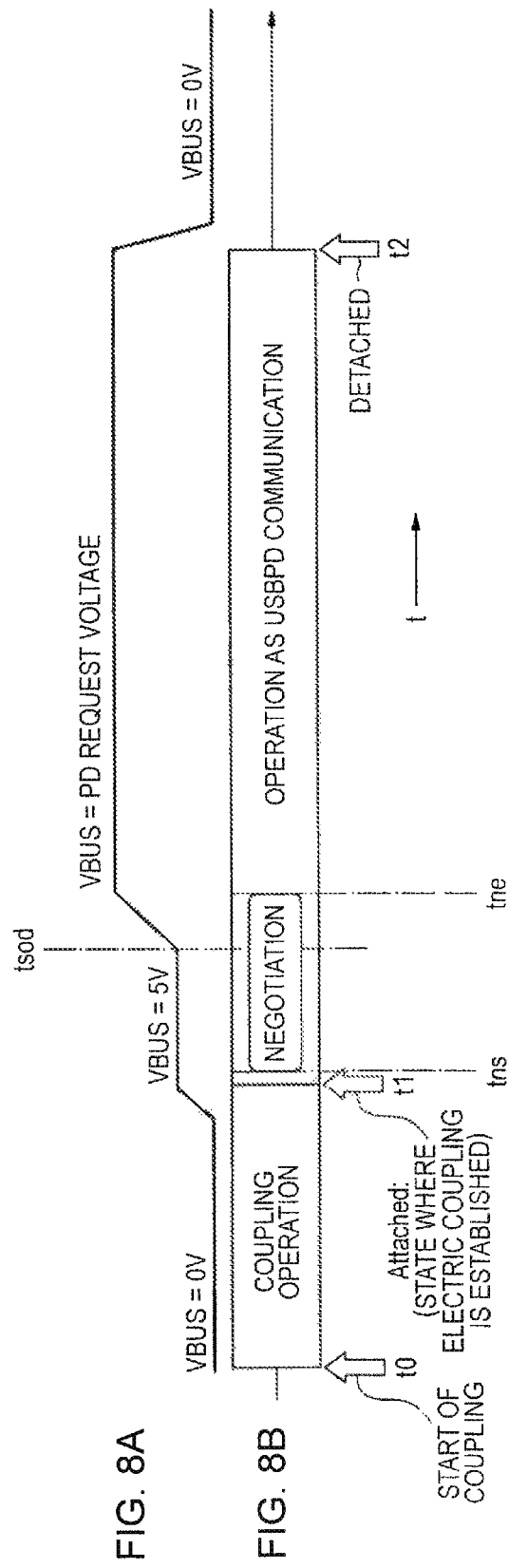

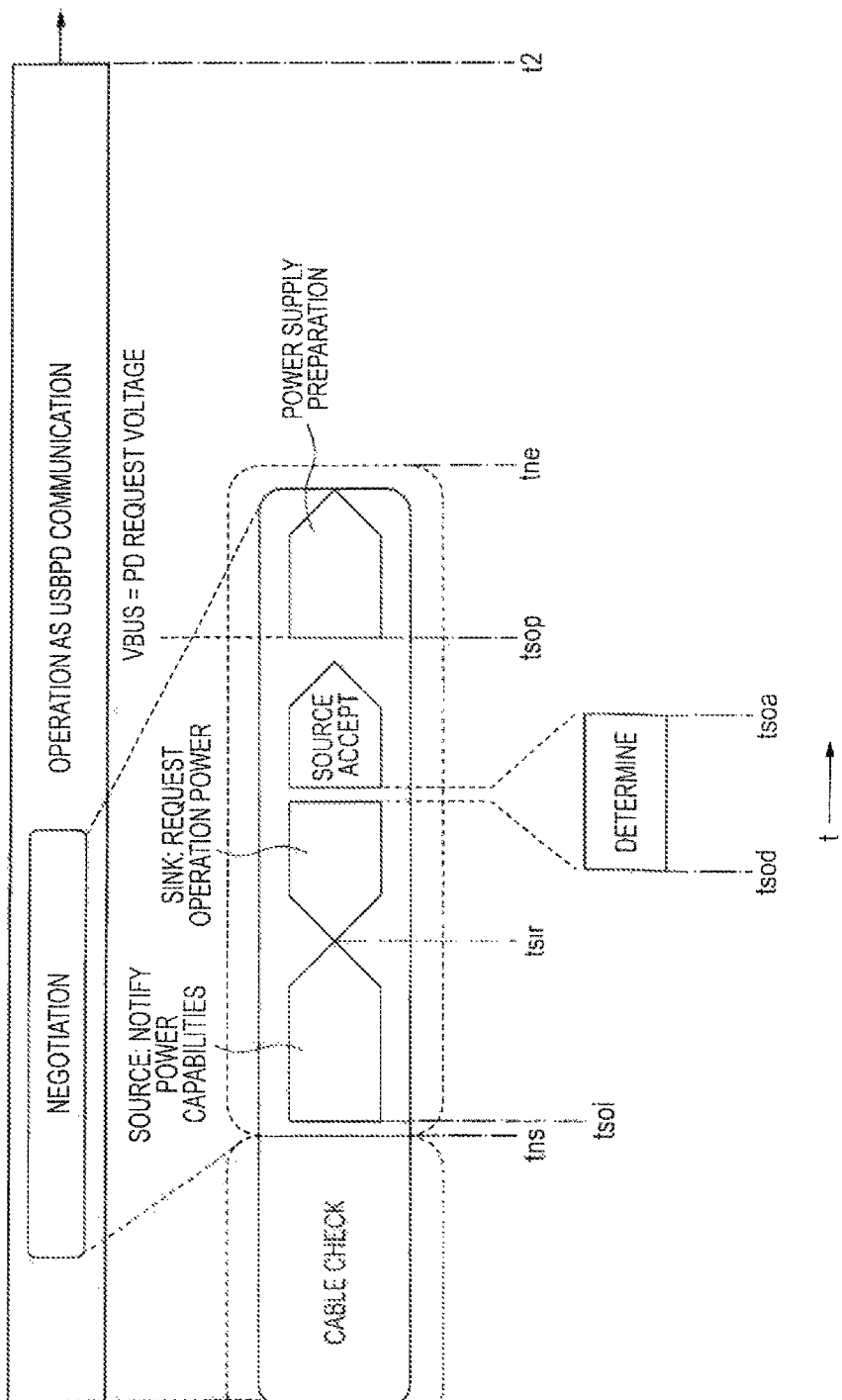

POWER SUPPLY SYSTEM AND SEMICONDUCTOR DEVICE USED FOR THE SAME

CROSS-REFERENCE TO RELATED APPLICATIONS

The disclosure of Japanese Patent Application No. 2017-215535 filed on Nov. 8, 2017 including the specification, drawings and abstract is incorporated herein by reference in its entirety.

BACKGROUND

The present invention relates to a power supply system having a universal serial bus (hereinbelow, called USB) port and a semiconductor device used for the same and, for example, relates to a power supply system conformed to the USB power delivery (hereinbelow, called USBPD) standard and a semiconductor device used for the same.

It is known that power is supplied from a USB port to a device electrically coupled to the USB port. As a standard of supplying power from a USB port, the USBPD standard is established.

For example, in Japanese Unexamined Patent Application Publication No. 2010-244457 (patent literature 1), FIG. 1 illustrates a USB hub device (3) having a plurality of USB ports (downstream ports 8a and 8b). In this case, when a USB device (2) and/or a USB device (9) are/is inserted to the downstream port 8a and/or the downstream port 8b, power is supplied from the USB hub device (3) to the USB device (2) and/or the USB device (9).

SUMMARY

In the USBPD standard, when a USB port of a power reception device is inserted to a USB port of a power supply device (hereinbelow, also called a power supply system), negotiation is executed between the power supply device and the power reception device. In the negotiation, the power supply device consents maximum power supplied to the power reception device and supplies power.

The power supply device has a plurality of USB ports. When USB ports of a plurality of power reception devices are inserted to the USB ports, the power supply device allocates the maximum power which can be supplied among the plurality of power reception devices in negotiation and grants it. When the sum of operation powers requested by the plurality of power reception devices exceeds the maximum power of the power supply device, in negotiation, the power reception device consents to supply maximum power smaller than the requested operation power to a part of the power reception devices.

To assign the maximum power equal to or larger than the requested operation power to a specific power reception device to which the maximum power smaller than the requested operation power is assigned, for example, it is requested to take out the USB ports of the specific power reception device and another power reception device from the USB ports of the power supply device and insert them again. By the operation, the negotiation is executed again, and the maximum power equal to or larger than the requested operation power can be assigned to the specific power reception device. In this case, however, a problem occurs such that the operation of taking out/inserting the USB ports becomes necessary.

When the maximum power which can be supplied of the power supply device is increased, without performing the operation of taking out/inserting the USB ports or the like, the maximum power equal to or larger than the requested operation power can be assigned. In this case, however, the size of the power supply device becomes physically large, and a problem of loss in portability occurs.

In the patent literature 1, a power supply device and a power reception device conformed to the USBPD standard are not written and the problem as described above is not recognized.

The other problems and novel features will become apparent from the description of the specification and appended drawings.

A power supply system according to an embodiment will be described as follows.

A power supply system conformed to a USBPD standard includes: a plurality of USB ports; a common power supply unit common to the plurality of USB ports; a plurality of power supply units corresponding to the plurality of USB ports, coupled to the corresponding USB ports and the common power supply unit, and supplying power to the corresponding USB ports; a plurality of controllers corresponding to the plurality of USB ports and each coupled to a corresponding USB port and a corresponding power supply unit; and a management unit executing allocation of maximum power to be assigned to the plurality of USB ports in accordance with signals from the plurality of controllers. The management unit determines whether surplus power is generated in maximum power assigned to a first USB port by execution of the allocation of the maximum power and, when surplus power is generated, increases the maximum power assigned to a second USB port.

The consumption power actually consumed by the power reception device electrically coupled to the first USB port fluctuates with time. Consequently, the actual consumption power in the power reception device has a period in which surplus to the maximum power assigned by the allocation of maximum power is generated. By assigning the surplus power to the second USB port, the maximum power assigned to the second USB port can be increased.

By detecting surplus in the maximum power assigned by the allocation of the maximum power with respect to the actual consumption power and increasing the maximum power assigned to the second USB port, the operation of taking out/inserting of the power reception device from the first and second USB ports and the like is not requested. Further, since the maximum power assigned to the second USB port is increased when surplus power is generated, the efficiency of giving power can be increased, it is unnecessary to increase the maximum power of the common power supply unit, and increase in the size of the power supply system can be prevented.

According to an embodiment, the power supply system in which an operation of taking out/insertion and the like from/to a USB port is reduced can be provided. The power supply system in which increase in size is suppressed can be provided.

BRIEF DESCRIPTION OF THE DRAWINGS

FIGS. 8A and 8B are timing charts illustrating operation of the power supply system according to the first embodiment.

FIGS. 9A to 9C are timing charts for explaining the operation of negotiation according to the first embodiment.

DETAILED DESCRIPTION

Figure 1:
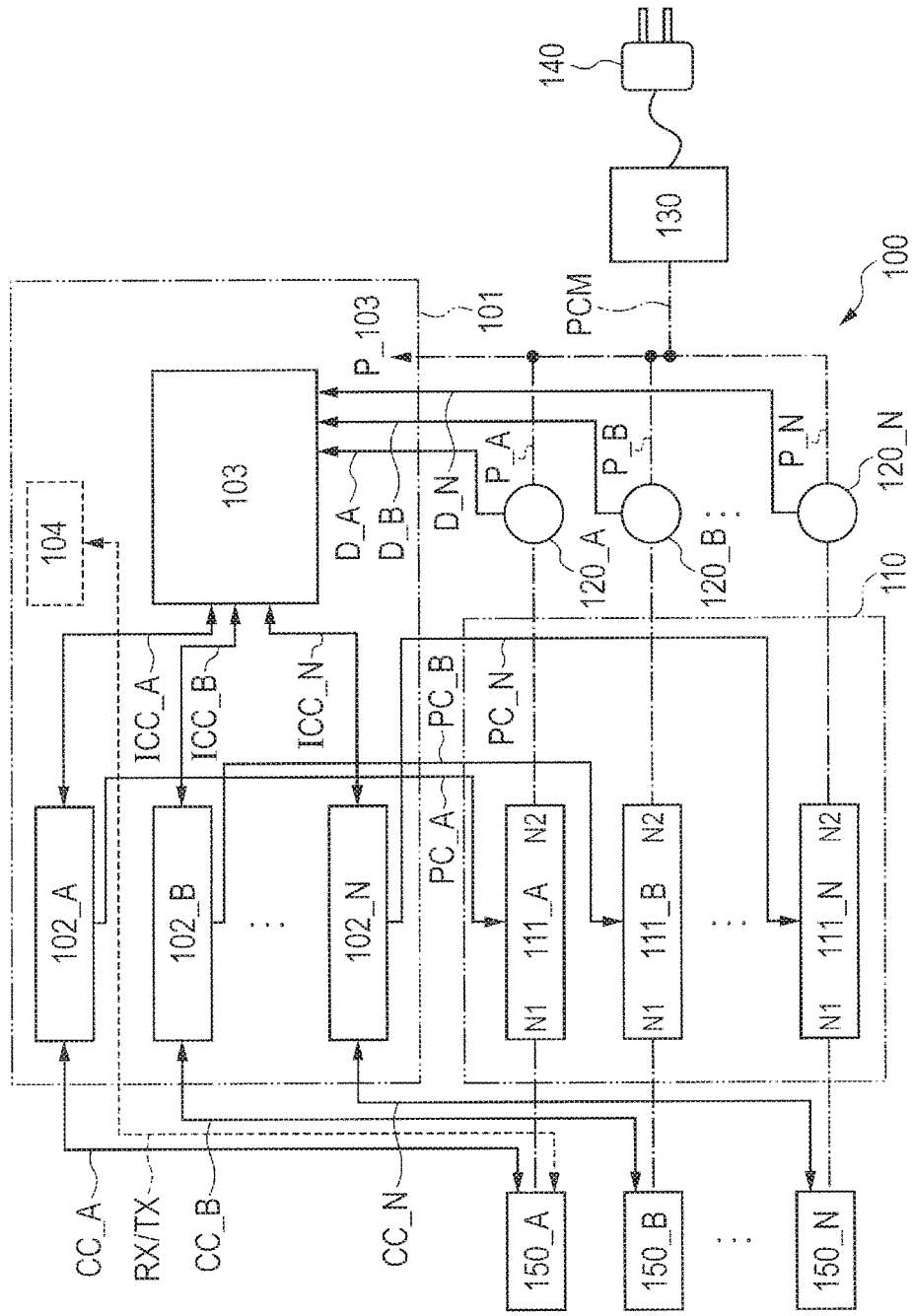
FIG. 1 is a block diagram illustrating the configuration of a power supply system according to a first embodiment.

Embodiments of the present invention will be described with reference to the drawings. The disclosure is just an example. Proper changes without departing from the gist which can be easily reached by a person skilled in the art are obviously included in the scope of the invention. In the diagrams, to clarify description, width, thickness, shape, and the like of each component may be schematically expressed as compared with those in an actual mode. The diagrams are just an example and do not limit interpretation of the present invention.

In the specification and the drawings, description of the same reference numerals are assigned to elements similar to those described already with a drawing may not be repeated.

First Embodiment

USBPD Standard

First, outline of the USBPD standard will be described. As an example, the case where USB ports provided for a power supply system and a power reception device conformed to the USBPD standard are of the USB type-C established in the standard of USB will be described.

A power supply system having USB ports and a power reception device having a USB port are coupled via a USB cable. Specifically, a USB terminal provided at one end of the USB cable is inserted to the USB port in the power supply system, and a USB terminal provided at the other end of the USB cable is inserted in the USB port of the power reception device. By the insertion, the power supply system and the power reception device are electrically coupled, and power is supplied from the power supply system to the power reception device.

Figure 6:
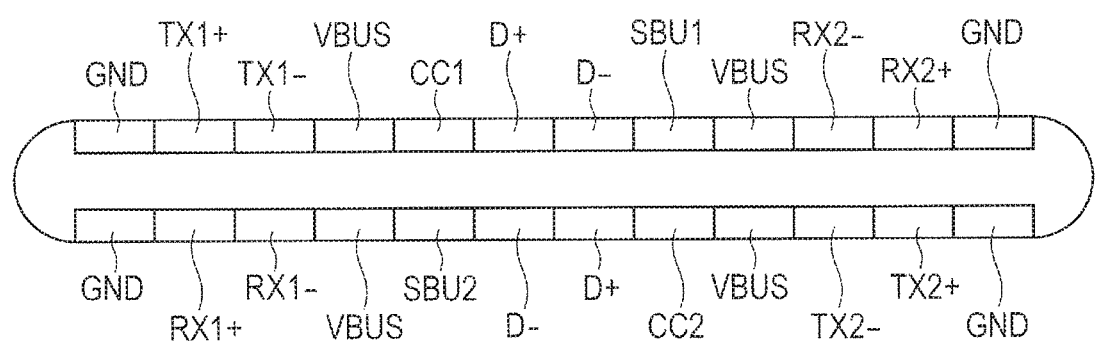
FIG. 6 is a terminal layout diagram illustrating terminal layout of a USB port of USB type-C.

FIG. 6 is a terminal layout diagram illustrating terminal layout of a USB port of the USB type-C. In the diagram, female USB ports are illustrated. At both ends of the USB cable, male USB terminals are provided. The male USB terminals are inserted to the (female) USB ports of the power supply system and the power reception device.

Although a plurality of terminals are arranged in the USB port of the USB type-C as illustrated in FIG. 6, only terminals related to the present invention will be described. In the diagram, GND indicates a ground voltage terminal for ground voltage, VBUS indicates a power supply terminal outputting or receiving feeding voltage at the time of power supply, and CC1 and CC2 indicate channel terminals for performing detection, USBPD communication, or the like. For example, the channel terminals CC1 and CC2 are used to detect whether the power reception device is electrically coupled to the power supply system or not and used in the case of performing the USBPD communication between the power supply system and the power reception device. At the time of power supply, the ground voltage is supplied from the ground voltage terminal GND in the USB port of the power supply system to the ground voltage terminal GND in the USB port of the power reception device. Further, feeding voltage is supplied from the power supply terminal VBUS in the USB port of the power supply system to the USB port of the power reception device.

In the USBPD standard, a function called role swap exists. By swapping the roles, the power reception device operates as a power supply system supplying power, and the power supply system operates as a power reception device receiving power. The power supply side of supplying power is also called a source, and the power reception side of receiving power is also called a sink. By the role swap, the source functions as a sink, and the sink functions as a source.

Figure 7:
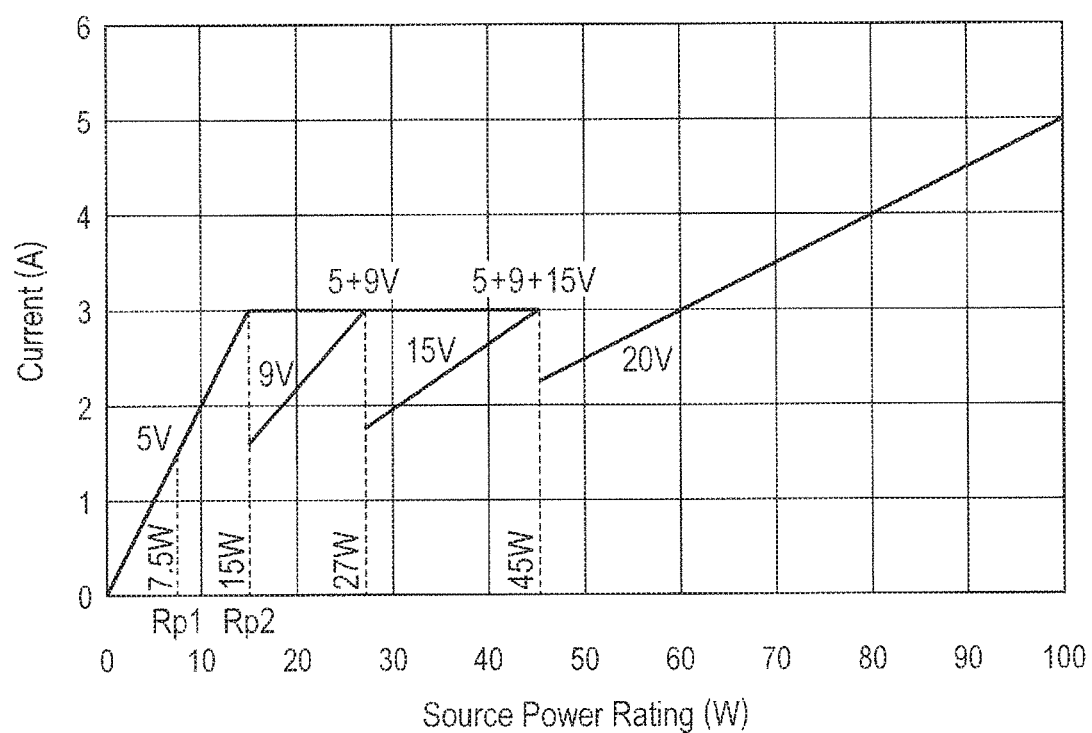
FIG. 7 is an explanatory diagram for explaining the USBPD standard.

FIG. 7 is an explanatory diagram for explaining the USBPD standard. In the diagram, the horizontal axis indicates power from the source, and the vertical axis indicates current from the source. In the present USBPD standard, the maximum power which can be supplied by one USB port is arranged as five powers of 15 W, 27 W, 45 W, 60 W and 100 W. By the USBPD communication using the channel terminals CC1 and CC2, negotiation is executed between the source and the sink. By the negotiation, the maximum power supplied from the source to the sink is assigned.

In the case of assigning, for example, the maximum power of 15 (W) from the source to the sink by the negotiation, as illustrated in FIG. 7, the source can supply current within the range exceeding 0 (A) and equal to or less than 3 (A) by the feeding voltage of 5(V). That is, as illustrated in FIG. 7, the source can supply power Rp1 of 7.5 (W) and power Rp2 of 15 (W). Further, for example, in the case of assigning 45 (W) as the maximum power by negotiation, the source can supply power also in the case where the feeding voltage is 9(V) and the maximum power is 27 (W) and the case where the feeding voltage is 5(V) and the maximum power is 15 (W).

On the other hand, also in the case where the maximum power smaller than the requested operation power is assigned in the negotiation, the sink is requested to operate. For example, also when the sink requests the operation power 45 (W) and, by execution of negotiation, 27 (W) or 15 (W) is assigned as the maximum power, the sink operates at the assigned maximum power.

Next, the USBPD communication using the channel terminals CC1 and CC2 and the negotiation executed by the USBPD communication will be described.

FIGS. 8A and 8B are timing charts illustrating operation of the power supply system according to the first embodiment. In the diagrams, the operations performed when the source and the sink are coupled via a USB cable. FIG. 8A illustrates the voltage change in the power supply terminal VBUS in the USB port of the source, and FIG. 8B illustrates the operations executed by the USBPD communication using the channel terminals CC1 and CC2. The horizontal axis in FIG. 8 indicates time "t".

First, at time t0, the USB cable is inserted in the USB port of each of the source and the sink, and the coupling starts. The source confirms that the sink is inserted via the USB cable in the coupling operation started from the time t0 and confirms that the sink is attached at time t1. That is, at time t1, electric coupling between the source and the sink is established, the USBPD communication is performed between the source and the sink, and the operation by the USBPD communication starts.

Since the source and the sink are not coupled before the coupling start (time t0), the voltage of the power supply terminal VBUS in the USB port of the source is the ground voltage (0(V)). At time slightly before the time t1 when the USBPD communication starts between the source and the sink, the sink supplies first voltage (in the example of the diagram, 5 (V)) as feeding voltage from the power supply terminal VBUS to the sink. For example, the sink starts the operation of the USBPD communication using the feeding voltage (first voltage) as power supply voltage.

By the USBPD communication started from the time t1, negotiation is executed. As will be described later with reference to FIG. 9, the source changes the voltage value of the feeding voltage supplied from the power supply terminal VBUS from the first voltage to second voltage (PD request voltage) consented by the negotiation and supplies the second voltage. The USBPD communication using the channel terminals CC1 and CC2 is continuously performed until the sink is disconnected from the source (time t2), and various operations are performed by the USBPD communication until the disconnection. Until the sink is disconnected from the source, the second voltage is continuously output from the power supply terminal VBUS of the source. When disconnected, the source outputs the ground voltage from its power supply terminal VBUS.

FIGS. 9A to 9C are timing charts for explaining the operation of negotiation according to the first embodiment. In the diagram, the horizontal axis indicates time "t". FIG. 9A indicates the operation executed by the USBPD communication between time t1 and time t2. FIG. 9B specifically illustrates negotiation executed between the time t1 and t2 and the operation performed before that. FIG. 9C illustrates the process executed by the source in the negotiation. Before start of the negotiation, the source checks a USB cable. The USB check is made to see whether the USB cable coupling the source and the sink is, for example, a cable authenticated by the USBPD standard. In the case of an authenticated cable, the source executes negotiation. In the case of an unauthenticated cable, the source does not execute negotiation.

Although not limited, the negotiation starts at time tns and is finished at time tne. The source notifies the sink of maximum power which can be supplied in the USBPD communication at time tsoi. Specifically, the largest maximum power which can be supplied in the five maximum powers arranged in the USBPD standard is notified to the sink. The sink requests the source for operation power by the USBPD communication at time tsir. The source compares the notified maximum power and the operation power requested by the sink and makes determination in the period between the time tsod and time tsoa.

When it is determined that the operation power requested by the sink exceeds the notified maximum power, the source notifies the sink of the maximum power which is equal to or less than the notified maximum power in the five maximum powers (15 (W), 27 (W), 45 (W), 60 (W), and 100 (W)) at the time tsoa, and consents the sink that the maximum power is supplied. On the other hand, when it is determined that the requested operation power is equal to or smaller than the notified maximum power, the source consents the sink that the maximum power notified earlier is supplied. Although not limited, the sink makes a request while expressing the operation power by request voltage (PD request voltage) and request current. Similarly, the source sends a notification by expressing the maximum power by feeding voltage and feeding current.

After that, the source prepares supply of power from the time tsop. In the power supply preparation, the source operates so that the feeding voltage output from the power supply terminal VBUS becomes the PD request voltage. Accordingly, from the time tsop, the voltage of the power supply terminal VBUS changes from first voltage toward second voltage as illustrated in FIG. 8.

Although the example of coupling the USB port of the source and the USB port of the sink by the USB cable has been described, the present invention is not limited to the example. For example, when the USB port of the source or the USB port of the ink is constructed by a male USB terminal, the source and the sink can be directly coupled without using a USB cable.

Configuration of Power Supply System

FIG. 1 is a block diagram illustrating the configuration of the power supply system according to the first embodiment. The diagram illustrates a power supply system 100. Although not limited, as an example of the power supply system 100, a system using a commercial AC power supply as a power supply and supplying power to a plurality of power reception devices will be described. Although the power supply system 100 is constructed by a plurality of electronic parts, FIG. 1 illustrates only electronic parts necessary for the explanation.

The power supply system 100 has semiconductor devices 101 and 110, ammeters 120_A to 120_N, a common power supply unit 130, a power supply plug 140, and USB ports 150_A to 150_N.

Each of the USB ports 150_A to 150_N has a structure of the USB type C described with reference to FIG. 6. By electrically coupling the USB port of a power reception device (not illustrated) conformed to the USB type-C described with reference to FIG. 6 to the USB ports 150_A to 150_N, power is supplied from the power supply system 100 to the power reception device.

The common power supply unit 130 is constructed by an AC/DC conversion circuit. The power supply plug 140 is coupled to a commercial AC power supply (AC) so that the common power supply unit 130 converts AC voltage to DC voltage and outputs the DC voltage. The common power supply unit 130 is commonly used by the USB ports 150_A to 150_N. That is, power PCM output from the common power supply unit 130 is allocated to the USB ports 150_A to 150_N and the like. In the diagram, consumption power supplied to the USB ports 150_A to 150_N and consumed by the distribution is expressed by reference characters P_A to P_N. The power supply system 100 functions so that the sum of the consumption power P_A to P_N in power reception devices electrically coupled to the USB ports 150_A to 150_N does not exceed the maximum power which can be supplied by the common power supply unit 130. The power indicted by the reference numeral P_103 will be described later.

The voltage output from the common power supply unit 130 is supplied to the semiconductor device 110 via the ammeters 120_A to 120_N. The current values measured by the ammeters 120_A to 120_N are supplied as detection signals D_A to D_N to the semiconductor device 101. Although not limited, the value of the voltage output from the common power supply unit 130 is, for example, the first voltage (5(V)). By obtaining the product of the detection signals D_A to D_N and the first voltage, the consumption power P_A to P_N can be calculated. Consequently, it can be regarded that the detection signals D_A to D_N express the consumption power consumed in the USB ports 150_A to 150_N. In this case, it can be regarded that a detection unit detecting consumption power is constructed by the ammeters 120_A to 120_N.

The semiconductor device 101 controls the semiconductor device 110 by power control signals PC_A to PC_N. The semiconductor device 110 is coupled to the power supply terminal VBUS of the USB ports 150_A to 150_N and changes the voltage value of the feeding voltage supplied to the power supply terminal VBUS in accordance with the power control signals PC_A to PC_N. On the other hand, the semiconductor device 101 is coupled to the channel terminals CC1 and CC2 of the USB ports 150_A to 150_N and, on the basis of signals by the USBPD communication and the detection signals D_A to D_N, generates the power control signals PC_A to PC_N.

Both of the semiconductor devices 101 and 110 are manufactured by a known semiconductor manufacturing technique. In the diagram, the transmission path of power (for example, PCM) is indicated by an alternate long and short dash line, and the transmission path of the detection signal (for example, D_A) and the power control signal (for example, PC_A) is indicated by a solid line. The semiconductor device 110 executes a process related to power, and the semiconductor device 101 executes a process related to a control signal or the like. Consequently, voltages to be processed in the semiconductor devices 101 and 110 are different from each other, and it is desirable that the semiconductor devices 101 and 110 are different semiconductor devices as illustrated in FIG. 1. To discriminate the semiconductor devices 101 and 110 from each other, in the following, the semiconductor device 110 executing a process related to power will be called a semiconductor device for power, and the semiconductor device 101 executing a process related to control will be also called a semiconductor device for control.

Semiconductor Devices 110 and 101

Next, the semiconductor device 101 for control and the semiconductor device 110 for power will be described. Although each of the semiconductor devices 101 and 110 has a plurality of circuit blocks, only circuit blocks related to the present invention are illustrated in FIG. 1.

Semiconductor Device 110 for Power

The semiconductor device 110 for power has a plurality of power supply units 111_A to 111_N. Although not limited, in the embodiment, the semiconductor device 110 for power has power supply units of the same number as that of USB ports and ammeters. The power supply units 111_A to 111_N correspond to the USB ports 150_A to 150_N and the ammeters 120_A to 120_N in a one-to-one corresponding manner. For example, the power supply unit 111_A corresponds to the USB port 150_A and the ammeter 120_A, and the power supply unit 111_N corresponds to the USB port 150_N and the ammeter 120_N.

Although not limited, the power supply units 111_A to 111_N have the same configuration and are controlled by the power control signals PC_A to PC_N output from the semiconductor device 101 for control. The power supply unit 111_A will be described as an example. The power supply unit 111_A is constructed by a voltage conversion circuit which converts the voltage supplied to a node N1 or N2 to a different voltage and outputs the voltage from the node N2 or N1. Although not limited, the voltage conversion circuit in the embodiment is constructed by a DC/DC converter, increases/decreases the voltage supplied to the node N1 or N2 as an input voltage, and outputs the increased (decreased) voltage as output voltage from the node N2 or N1. The voltage value of the voltage which is increased (decreased) is designated by the power control signal PC_A. The node N1 of the power supply unit 111_A is coupled to the power supply terminal VBUS of the corresponding USB port 150_A, and the node N2 is coupled to the common power supply unit 130 via the corresponding ammeter 120_A.

For example, by the power control signal PC_A, the voltage supplied to the node N2 is designated as input voltage, and it is designated to generate the voltage of 15(V) by increasing. In this case, since the first voltage (5(V)) is supplied to the node N2 via the ammeter 120_A, the power supply unit 111_A increases the input voltage 5(V) of the node N2 to 15(V) in accordance with designation of the power control signal PC_A, and the increased voltage 15(V) is output from the node N1. On the other hand, when the voltage supplied to the node N1 is designated as input voltage by the power control signal PC_A, the voltage of 5(V) generated by the decreasing is output from the node N2.

The semiconductor device 101 for control notifies role swap to the semiconductor device 110 for power by the power control signal PC_A. That is, by designating the direction of the input voltage and the output voltage by the power control signal PC_A, role swap is notified. It enables the USB port 150_A in the power supply system 100 to function as a USB port for power supply or a USB port for power reception.

In the case of making the USB port 150_A as a USB port for power supply, the voltage (5(V)) from the common power supply unit 130 is supplied to the node N2 of the power supply unit 111_A via the ammeter 120_A. The power supply unit 111_A performs the voltage increasing operation so that the voltage becomes a voltage designated by the power control signal PC_A, and the increased output voltage is supplied as PD request voltage to the power supply terminal VBUS of the USB port 150_A.

Since the remaining power supply units 111_B to 111_N are similar to the power supply unit 111_A, their description will not be given.

In the case of making the USB port 150_A function as a USB port for power reception, power is output from the power supply unit 111_A. The power is supplied to another power supply unit (for example, 111_B), and the power supply unit 111_B can increase the maximum power which can be supplied.

Semiconductor Device 101 for Control

Next, the semiconductor device 101 for control will be described. The semiconductor device 101 for control has power delivery controllers (hereinbelow, called PD controllers or simply controllers) 102_A to 102_N and a system policy management unit (hereinbelow, called management unit or simply manager) 103.

Although not limited, in the embodiment, the PD controllers 102_A to 102_N correspond to the USB ports 150_A to 150_N and the power supply units 111_A to 111_N in a one-to-one manner. Since the PD controllers 102_A to 102_N have the same configuration, the PD controller 102_A will be described as an example.

The PD controller 102_A is coupled to the corresponding USB port 150_A. By the coupling, at the time of USBPD communication, a signal CC_A is transmitted/received between the channel terminals CC1 and CC2 of the USB port 150_A and the PD controller 102_A. The PD controller 102_A transmits/receives a signal ICC_A to/from the manager 103, and outputs the power control signal PC_A controlling the corresponding power supply unit 111_A. At the time of USBPD communication, the PD controller 102_A transmits a signal from a power reception device coupled to the USB port 150_A to the manager 103, and transmits a signal output from the manager 103 to the power reception device coupled to the USB port 150_A. The PD controller 102_A outputs the power control signal PC_A according to the signal from the manager 103.

Like the PD controller 102_A, the remaining PD controllers 102_B to 102_N transmit/receive signals CC_B to CC_N to/from corresponding USB ports, transmit/receive signals ICC_B to ICC_N to/from the manager 103, and output the power control signals PC_B to PC_N controlling the corresponding power supply units.

Although not limited, in the embodiment, the manager 103 has a microprocessor (hereinbelow, called processor). When the processor executes a program, the function of the manager is realized. In the manager 103, the value of the maximum power which can be supplied by the common power supply unit 130 is preliminarily set.

To the manager 103, the detection signals D_A to D_N from the ammeters 120_A to 120_N and signals from the PD controllers 102_A to 102_N are supplied. The manager 103 outputs signals controlling the PD controllers 102_A to 102_N. In the diagram, the signals ICC_A to ICC_N express both signals supplied from the PD controllers and signals controlling the PD controllers.

When a USB cable is inserted in a corresponding USB port, each of the PD controllers 102_A to 102_N detects the insertion and sends notification to the manager 103. Each of the PD controllers 102_A to 102_N detects pull-out of the USB cable from the corresponding USB port and notifies it to the manager 103. By the above, the manager 103 detects whether the USB cable is inserted in the USB ports 150_A to 150_N and whether the USB cable is taken out from the USB ports 150_A to 150_N. Further, the manager 103 detects whether power P_103 is supplied from the common power supply unit 130 and detects whether the power supply plug 140 is coupled to a commercial AC power supply.

When the power supply plug 140 is coupled to a commercial AC power supply, based on signals from the PD controllers 102_A to 102_N, the manager 103 detects whether the USB port of the power reception device is inserted in the USB ports 150_A to 150_N. When the insertion of the USB port of the power reception device is detected, as illustrated with reference to FIGS. 8 and 9 and the like, the manager 103 performs the USBPD communication with the power reception device and executes negotiation. In this case, the manager 103 performs the USBPD communication with the power reception device via the PD controllers 102_A to 102_N.

When a plurality of power reception units are inserted in a plurality of USB ports, the manager 103 executes the negotiation with the reception devices, for example, in order of insertion. In the negotiation, the determination illustrated in FIG. 9C is executed by the manager 103. The maximum power consented by executing the determination is assigned to the reception device via the USB port. That is, when a plurality of power reception devices are inserted in a plurality of USB ports, the manager 103 executes the negotiation with the power reception devices in order of insertion, consents the maximum power in order of insertion, and assigns the consented maximum power to the power reception devices. The maximum power is allocated to each of the power reception devices.

The manager 103 controls the PD controller so as to output feeding voltage corresponding to the PD request voltage expressing operation power requested by the power reception device. In response to the control, the PD controller performs control by a power control signal so that a corresponding power supply unit outputs the feeding voltage corresponding to the PD request voltage.

Further, the manager 103 determines whether the maximum power which can be supplied at present is insufficient for the operation power from the power reception device notified via the PD controller or not. In the case where it is insufficient, if a power reception device having the role swap function exists in the power reception devices coupled to the USB ports, the manager 103 gives an instruction by the USBPD communication so that the power reception device functions as a source. When a power reception device functioning as a source does not exist, the manager 103 executes the negotiation again with the plurality of power reception devices coupled to the USB ports and re-sets the maximum power assigned to the plurality of power reception devices so as to be within the maximum power of the common power supply unit 130.

Also when it is detected that the USB port of the power reception device is taken out from the USB port by a signal from the PD controller, in response to the taking-out, the manager 103 executes the negotiation with the power reception device continuously coupled to the USB port and newly distributes the maximum power.

In the embodiment, the detection signals D_A to D_N are supplied to the manager 103. When the consumption power of the reception devices expressed by the detection signals D_A to D_N (consumption power in the USB ports 150_A to 150_N) becomes smaller than the maximum power consented in the negotiation executed when the power reception device is inserted in the USB port, the manager 103 determines that surplus power is generated.

In negation executed when the power reception devices are inserted in the USB ports 150_A to 150_N, the manager 103 stores the USB port consented by the maximum power lower than the operation power requested from the power reception device. When occurrence of surplus power is determined, the manager 103 executes the negotiation again with the power reception device coupled to the UPSB port consented with the low maximum power. To discriminate the negotiation executed when a USB port of a power reception device is inserted in a USB port of a power supply system and the negotiation executed again when surplus power is generated, hereinbelow, the former will be called negotiation upon insertion (first negotiation) and the latter will be called negotiation upon surplus supply (second negotiation).

The operation of the negotiation upon surplus supply is similar to the operation illustrated in FIGS. 9B and 9B. The different points are that the maximum power notified to the power reception device by the manager 103 is a value obtained by adding surplus power to maximum power consented by the negotiation upon insertion, and the object of the negotiation upon surplus supply is a power reception device which consented the maximum power smaller than the operation power in the negotiation upon insertion.

That is, the manager 103 executes the negotiation upon surplus supply to, as a target, a power reception device coupled to the USB port which is stored as one consented with the maximum power smaller than the operation power in the negotiation upon insertion. In the negotiation upon surplus supply, the manager 103 adds the surplus power to the maximum power consented in the negotiation upon insertion and notifies the resultant to the power reception device. In response, the operation power is requested from the power reception device. In the determination, the maximum power to which the surplus power is added and the operation power are compared. When the maximum power to which the surplus power is added is equal to or larger than the requested operation power, the manager 103 gives consent to the power reception device by supplying the smallest maximum power including the requested operation power in the above-described five maximum powers (arranged in the USBPD standard).

Consequently, when surplus power is generated, the maximum power consented to a power reception device different from the power reception device in which the surplus power is generated can be increased. In this case, in response to that the power reception device is coupled to the USB port, the manager 103 does not execute the negotiation upon surplus supply but executes the negotiation upon surplus supply on the basis of consumption power expressed by a detection signal. That is, the manager 103 starts the negotiation upon surplus supply in a state where the power reception device is continuously coupled to the USB port.

In FIG. 1, reference numeral 104 indicates a process unit coupled to the USB port 150_A. As the process unit 104 will be described later in a fourth embodiment, its description is not given here.

Operation Example of Power Supply System

Next, an operation example of a power supply system when surplus power is generated will be described. FIGS. 2A to 2D are diagrams for explaining the operation of the power supply system according to the first embodiment. FIG. 2A is a block diagram of the power supply system 100 to which power reception devices Sink_A to Sink_C are coupled. FIGS. 2B to 2D are waveform charts illustrating changes in consumption powers of the power reception devices Sink_A to Sink_C. The horizontal axis indicates time "t", and the vertical axis indicates consumption power. FIG. 2B indicates changes in the consumption power of the power reception device Sink_A, FIG. 2C indicates changes in the consumption power of the power reception device Sink_B, and FIG. 2D indicates charges in the consumption power of the power reception device Sink_C. Although the case where three power reception devices are coupled will be described, the invention is not limited to the number.

To avoid complication of the diagrams, in the power supply system 100 of FIG. 2A, only the USB port 150 and the power supply plug 140 illustrated in FIG. 1 are drawn. However, the power supply system 100 of FIG. 2A has the configuration illustrated in FIG. 1. The power reception devices Sink_A to Sink_C have USB ports USB_SA to USB_SC and operate by the feeding voltage supplied via the USB ports.

First, the operation performed when the USB ports (third USB port) USB_SA to the USB port (fourth USB port) USB_SC of the power reception devices Sink_A to Sink_C are inserted in the USB ports 150_A to 150_C of the power supply system 100 via the USB cables USB_K will be described. The case where the USB port USB_SA of the power reception device Sink_A is inserted first to the USB port 150_A and, after that, the USB ports of the power reception devices Sink_B and Sink_C are inserted in the USB ports 150_B and 150_C in order of the power reception devices Sink_B to Sink_C will be described. Although not limited, the power supply system 100 determines the priority order of the USB ports 150_A to 150_C in order of insertion of the power supply devices. Specifically, the higher the order of insertion is, the higher the priority order of the USB ports is. Consequently, when the USB ports of the power reception devices are inserted in the above-described order, the priority order of the USB port 150_A in which the power reception device Sink_A is inserted becomes higher than the USB ports 150_B and 150_C and, further, the priority order of the USB port 150_B becomes higher than that of the USB port 150_C.

It is assumed that each of the power reception devices Sink_A to Sink_C is a power reception device conformed to the USBPD standard. Obviously, the power supply system 100 is conformed to the USBPD standard as described above. It is also assumed that the USB cable USB_K coupling the power supply system and the power supply device is a recognized USB cable. As described with reference to FIG. 8, when the USB cables USB_K are not inserted to the USB ports 150_A to 150_C of the power supply system 100, the power supply system 100 stops feeding of power.

When the USB ports USB_SA to USB_SC of the power reception devices Sink_A to Sink_C are inserted in the USB ports 150_A to 150_C of the power supply system via the USB cables USB_K, the manager 103 detects the coupling via the PD controllers. Upon detection, the manager 103 instructs the PD controllers 102_A to 102_C to supply the first voltage (5V) to the power supply terminal VBUS to the corresponding power supply units 111_A to 111_C. Consequently, as illustrated in FIG. 8, the first voltage is supplied to the power supply terminal VBUS, and the first voltage is supplied to each of the power reception devices Sink_A to Sink_C.

Next, the manager 103 checks the USB cables USB_K coupling the USB ports 150_A to 150_C and the power reception devices Sink_A to Sink_C as illustrated in FIG. 9.

After that, the manager 103 executes a negotiation NG_I on insertion described with reference to FIG. 9 via the PD controllers 102_A to 102_C. In this case, since the USB port of the power reception device Sink_A is inserted in the USB port 150_A first, priority is given to the USB port 150_A and the manager 103 executes the negotiation NG_I upon insertion with the power reception unit Sink_A and, after that, executes the negotiation NG_I upon insertion in order of the power reception devices Sink_B and Sink_C.

The manager 103 distributes the maximum power to the power reception devices Sink_A to Sink_C by executing the negotiation NG_I upon insertion sequentially to the power reception devices Sink_A to Sink_C. In other words, the manager 103 distributes the maximum power of the common power supply unit 130 to the USB ports 150_A to 150_C.

Although not limited, to facilitate description, it is assumed that the maximum power which can be supplied by the common power supply unit 130 is 80 (W) and the maximum consumption power of each of the power reception devices Sink_A to Sink_C is 45 (W). Consequently, each of the power reception devices Sink_A to Sink_C requests the maximum consumption power 45 (W) as the operation power at the time of the negotiation NG_I upon insertion.

First, the manager 103 executes the negotiation NG_I upon insertion with the power reception device (first power reception device) Sink_A. In the negotiation NG_I upon insertion, the manager 103 notifies the power reception device Sink_A of 80 (W) as the maximum power. On the other hand, the power reception device Sink_A demands for operation power 45 (W). In this case, the manager 103 determines that the notified maximum power is larger than the operation power and consents to the power reception device Sink_A at the maximum power 45 (W) corresponding to the requested operation power 45 (W). Since the operation power is requested in the form of the request current and the PD request voltage from the power reception device Sink_A, the manager 103 controls so that the power supply unit 111_A outputs the PD request voltage to the PD controller 102_A. In response to this, the PD controller 102_A controls so that the power supply unit 111_A outputs the PD request voltage by the power control signal PC_A. By the operation, the maximum power 45 (W) is allocated to the power reception device Sink_A as requested.

Subsequently, the manager 103 executes the negotiation NG_I upon insertion with the power reception device Sink_B. In the negotiation NG_I upon insertion, the manager 103 notifies, as the maximum power, the maximum power 35 (W) obtained by subtracting the maximum power already consented to the power reception device Sink_A from the maximum power of the common power supply unit 130 to the power reception device Sink_A. On the other hand, from the power reception device Sink_B to the manager 103, 45 (W) is requested as the operation power. The manager 103 determines that the requested operation power exceeds the notified maximum power and consents the power reception device Sink_B at the maximum power smaller than the requested operation power in accordance with the USBPD standard. It is assumed that consent is given at the maximum power 15 (W).

The manager 103 controls the PD controller 102_B so that the power supply unit 111_B outputs the PD request voltage from the power reception device Sink_B. By the control, the PD controller 102_B controls so that the power supply unit 111_B outputs the PD request voltage by the power control signal PC_B. By the operations, the maximum power 15 (W) smaller than the requested operation power (45 (W)) is allocated to the power reception device Sink_B. In this case, the power reception device Sink_B operates in the range of the maximum power consented by the manager 103, that is, the maximum power 15 (W).

Subsequent to the power reception device Sink_B, the manager 103 executes the negotiation NG_I upon insertion with the power reception device (second power reception device) Sink_C. In the negotiation NG_I upon insertion with the power reception device Sink_C, the manager 103 notifies, as the maximum power, the maximum power 20 (W) obtained by subtracting the maximum power already allocated to the power reception devices Sink_A and Sink_B from the maximum power of the common power supply unit 130. On the other hand, as the operation power, 45 (W) is requested from the power reception device Sink_C to the manager 103. The manager 103 determines that the requested operation power exceeds the notified maximum power and consents the power reception device Sink_C at the maximum power smaller than the requested operation power in accordance with the USBPD standard.

It is assumed here that the maximum power 15 (W) is consented. Subsequently, the manager 103 controls the PD controller 102_C so that the power supply unit 111_C generates the PD request voltage from the power reception device Sink_C. By the control, the PD controller 102_C controls so that the power supply unit 111_C outputs the PD request voltage by the power control signal PC_C. By the control, the maximum power 15 (W) smaller than the requested operation power (45 (W)) is allocated to the reception power device Sink_C. The reception power device Sink_C operates in the range of the maximum power (15 (W)) consented by the manager 103.

As described above, when the power reception devices Sink_A to Sink_C are inserted in order of the USB ports 150_A to 150_C, the insertion is detected, and the manager 103 sequentially executes the negotiation NG_I upon insertion so that the maximum power of the common power supply unit 130 is allocated to the power reception devices Sink_A to Sink_C so as not to exceed the maximum power of the common power supply unit 130. That is, due to the insertion of the power reception devices to the USB ports, the negotiation NG_I upon insertion to distribute the maximum power is executed. In the negotiation NG_I upon insertion, the manager 103 stores a USB port which consents the maximum power smaller than the requested operation power. In the above-described example, the manager 103 stores the USB ports 150_B and 150_C.

Although each of the power reception devices Sink_A to Sink_C operates within the range of the allocated maximum power, each of the consumption powers changes (fluctuates) with time. That is, the power reception devices Sink_A to Sink_C do not always consume the maximum power. In the embodiment, currents flowing from the common power supply unit 130 to the power supply units 111_A to 111_C are measured by the ammeters 120_A to 120_C and supplied as detection signals D_A to D_C to the manager 103. Since the output voltage of the common power supply unit 130 is determined, the currents (consumption currents) expressed by the detection signals D_A to D_C express the consumption powers P_A to P_C consumed by the power reception devices Sink_A to Sink_C.

The manager 103 always monitors the detection signals D_A to D_C. When the consumption power expressed by the detection signals D_A to D_C decreases and an excess is generated in the maximum power consented in the negotiation NG_I upon insertion, the manager 103 executes the negotiation NG_U upon surplus supply with a specific power reception device. That is, in the negotiation NG_I upon insertion executed due to the insertion of the power reception device to the USB port, the manager 103 executes the negotiation NG_U upon surplus supply using the power reception device consented the maximum power smaller than the requested operation power as a specific power reception device. Since the USB port consented the maximum power smaller than the requested operation power in the negotiation NG_I upon insertion is stored as described above, the power reception device executing the negotiation NG_U upon surplus supply can be specified.

Although not limited, in the embodiment, when the consumption power becomes smaller than the maximum power consented in the negotiation NG_I upon insertion by 30 (W) or more, it is determined that surplus power is generated. That is, the criterion of whether surplus power is generated or not is 30 (W).

The manager 103 selects the power reception device Sink_B or Sink_C as a specific power reception device. The case where the power reception device Sink_C is selected as a specific power reception device will be described. Consequently, the consumption power of the power reception device Sink_B is limited to the maximum power 15 (W) as illustrated in FIG. 2C.

In FIGS. 2B to 2D, reference characters tcnt indicate time when the maximum power is consented in the negotiation NG_I upon insertion and power supply is started to the power reception devices Sink_A to Sink_C. Since the negotiation NG_I upon insertion is executed sequentially from the power reception device Sink_A to the power reception device Sink_C as described above, the timings that power is supplied to the power reception devices Sink_A to Sink_C are different. However, in the diagrams, to make the description easy, it is illustrated that the time tcnt is the same.

The consumption power in the power reception device Sink_A increases from the time tcnt and, after that, decreases. At time tng1, the manager 103 detects that, from the detection signal D_A, the consumption power in the USB port (first USB port) 150_A becomes smaller than the maximum power consented by the negotiation NG_I upon insertion by 30 (W) or more. Due to the detection, the manager 103 executes the negotiation NG_U upon surplus supply with the power reception device Sink_C inserted in the USB port (second USB port) 150_C.

In the negotiation NG_U upon surplus supply, the manager 103 adds the surplus power (30 (W)) to the maximum power (15 (W)) consented in the power reception device Sink_C in the negotiation NG_I upon insertion and notifies the maximum power (45 (W)) increased by the addition to the power reception device Sink_C. On the other hand, the power reception device Sink_C requests 45 (W) as operation power like in the negotiation NG_I upon insertion. The manager 103 determines the notified maximum power and the requested operation power are equal and consents the power reception device Sink_C to supply power at the notified maximum power (45 (W)).

The power reception device Sink_C consents supply of the maximum power 45 (W) by the manager 103 at time tng1. Consequently, at time tng1 and after, the power reception device Sink_C can execute a process whose consumption power exceeds 15 (W). Since the power reception device Sink_C executes a process exceeding 15 (W), as illustrated in FIG. 2D, the consumption power of the power reception device Sink_C increases after time tng1, and power up to the power corresponding to the consented maximum power can be used.

As described above, the negotiation NG_I upon insertion is performed in a state where the first voltage is supplied to the power supply terminal VBUS. On the other hand, the negotiation NG_U upon surplus supply is executed in a state where the power supply unit 111_C supplies the PD request voltage (second voltage). Consequently, the power supply unit 111_C continuously supplies the PD request voltage to the power reception device Sink_C before and after the negotiation NG_U upon surplus supply. Since the manager 103 executes the negotiation NG_U upon surplus supply due to the detection signal D_A, without performing operations of taking out/inserting the power reception devices Sink_A to Sink_C from/to the USB ports 150_A to 150_C, the surplus power can be allocated to another USB port (150_C), and the maximum power allocated to the power reception device (Sink_C) inserted in another USB port can be increased.

Although an example of distributing surplus power to another USB port (150_C) has been described above, the manager 103 may execute the negotiation NG_U upon surplus supply with both the power reception devices Sink_B and Sink_C. In such a manner, for example, surplus power can be allocated to two (plural) power reception devices.

Although the case where sum of the maximum power consented in the negotiation NG_I upon insertion and the surplus power is equal to the request power of the power reception device Sink_C has been described, the powers may be different. When maximum power larger than the maximum power consented in the negotiation NG_I upon insertion is consented in the negotiation NG_U upon surplus supply, the power reception device Sink_C can execute a process by which the consumption power increases more.

Although the case the consumption power of the power reception device Sink_A in which the maximum power corresponding to the requested operation power is consented in the negotiation NG_I upon insertion decreases has been described as an example, the invention is not limited to the case. For example, when the consumption power of the power reception device consented at the maximum power smaller than the requested operation power in the negotiation upon insertion decreases and surplus power is generated, the surplus power can be allocated to another USB port.

For example, as illustrated in FIG. 2A, in the power reception device Sink_A, immediately after the operation starts, the consumption power becomes largely smaller than the maximum power consented in the negotiation NG_I upon insertion. In this case as well, the manager 103 determines that surplus power is generated. At the start point of such operation, to avoid determination of the manager 103 that surplus power is generated, for example, it is sufficient for the manager 103 to determine whether surplus power is generated or not only when the consumption power decreases.

At the time of the negotiation NG_I upon insertion, the power reception device requests each operation power to the power supply system, and the power supply system distributes the maximum power according to the requested operation power to the USB port to which the power reception device is coupled. However, consumption power actually consumed by the power reception device changes according to the situation of the power reception device at that time and there is a period that the consumption current is 0 (A) and the consumption power is 0 (W). In this case, the power supply system assigns power equal to or larger than that in the actual use state of the power reception device to the USB port, and it is inefficient. When the maximum power equal to or larger than that in the use state is assigned, it may become difficult to assign requested maximum power to a power reception device.

In the embodiment, the manager 103 determines whether there is surplus power in the maximum power assigned to a predetermined USB port (for example, 150_A) by execution of the negotiation NG_I upon insertion on the basis of the detection signal D_A. When there is surplus power, the manager 103 increases the maximum power assigned to another USB port (for example, 150_C). In such a manner, power flexibility can be improved, and power supply efficiency of the power supply system can be maximized. When surplus power is detected, in response, the manager 103 executes the negotiation NG_U upon surplus supply. Consequently, without executing an operation of recoupling such as taking out/insertion of a power reception device inserted in a USB port of the power supply system, the surplus power can be assigned to another USB port. Therefore, for example, a batter is coupled as a power reception device to the power supply system, without performing the operation of recoupling, the power supplied to the battery can be increased. While reducing troublesomeness of the operation, the charge time required to charge the battery can be shortened.

Figure 2:
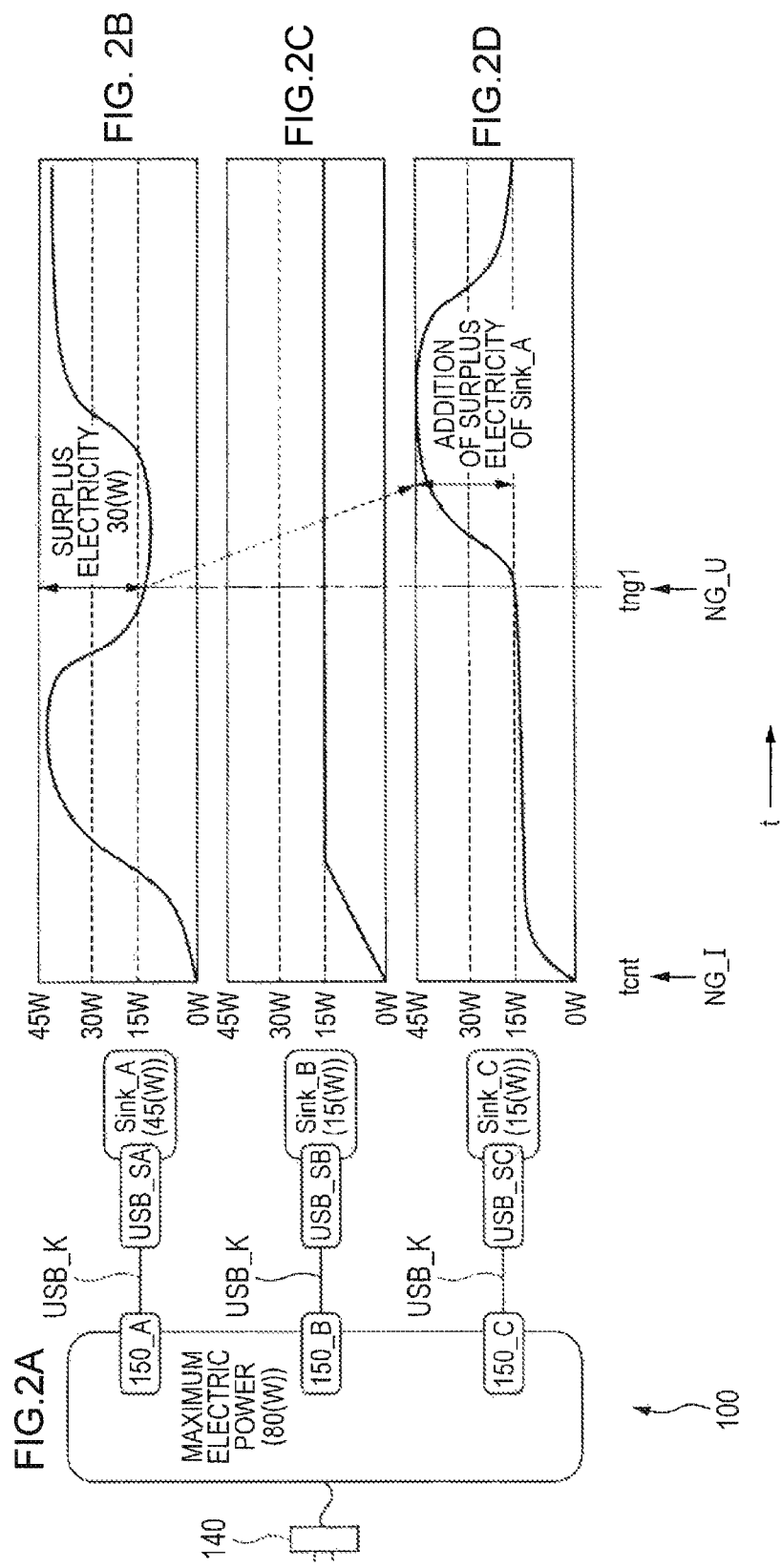
FIGS. 2A to 2D are diagrams for explaining the operation of the power supply system according to the first embodiment.

In addition, it becomes unnecessary to set the maximum power which can be supplied by the power supply system equal to or larger than sum of operation powers requested by power reception devices, so that increase in the size of the power supply system can be suppressed. In the example of FIG. 2, when the operation powers of the power reception devices Sink_A to Sink_C are summed up, 135 (W) is requested as the maximum power which can be supplied by the power supply system 100. However, as described above, the maximum power of the power supply system 100 is 80 (W). Consequently, increase in the size of the common power supply unit 130 and the like can be avoided, and increase in the size of the power supply system 100 can be suppressed.

Second Embodiment

Figure 3:
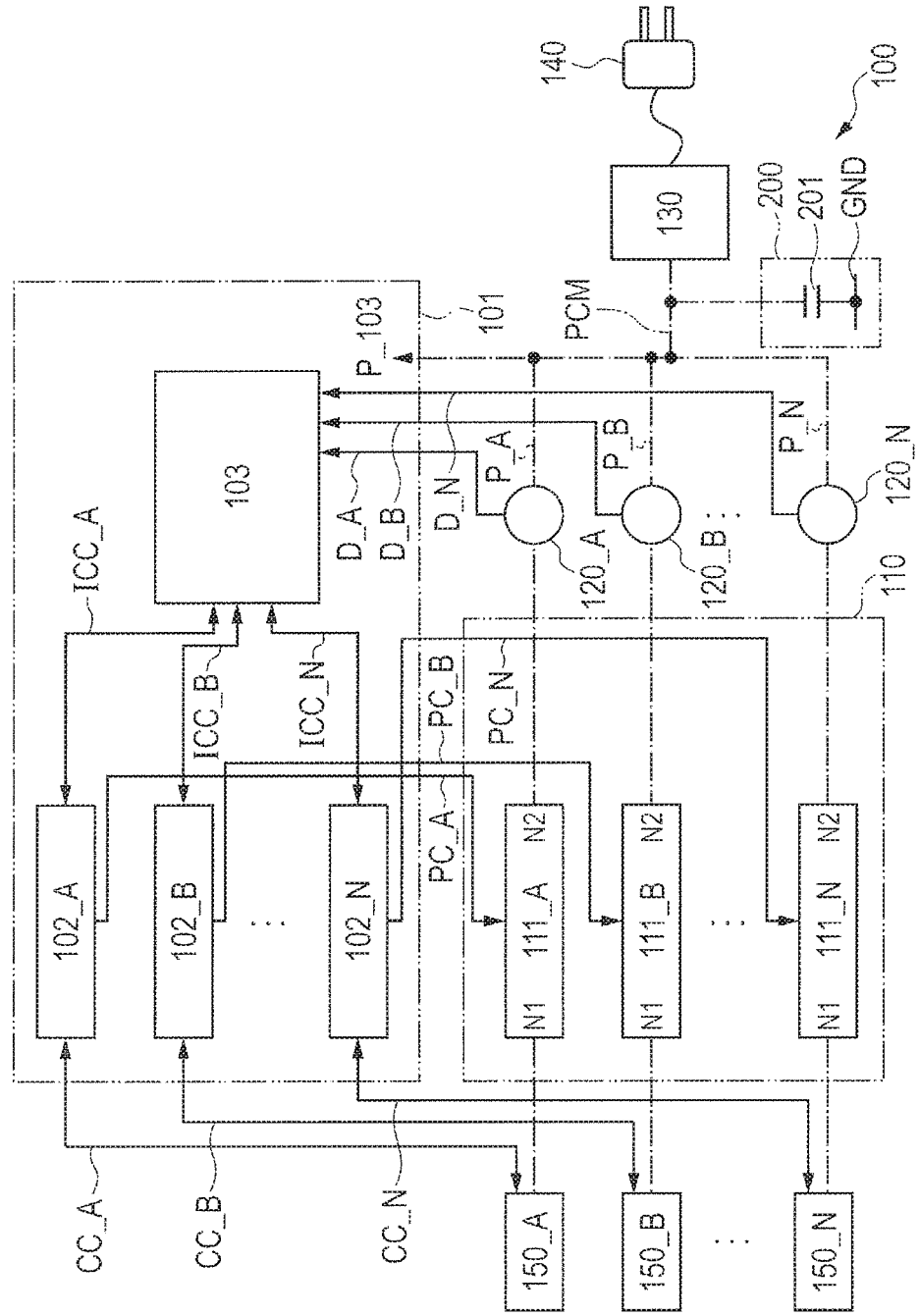
FIG. 3 is a block diagram illustrating the configuration of a power supply system according to a second embodiment.

FIG. 3 is a block diagram illustrating the configuration of a power supply system according to a second embodiment. Since FIG. 3 is similar to FIG. 1, the different point will be mainly described. The different point is that an auxiliary power supply unit 200 is added to the power supply system 100. In FIG. 3, a process unit 104 which will be described in fourth embodiment is not illustrated.

The auxiliary power supply unit 200 has a capacitor 201 coupled in parallel between the output of the common power supply unit and the ground voltage terminal GND. When surplus power decreases, the auxiliary power supply unit 200 supplementarily supplies power (auxiliary power) to a power reception device having surplus power.

Figure 4:
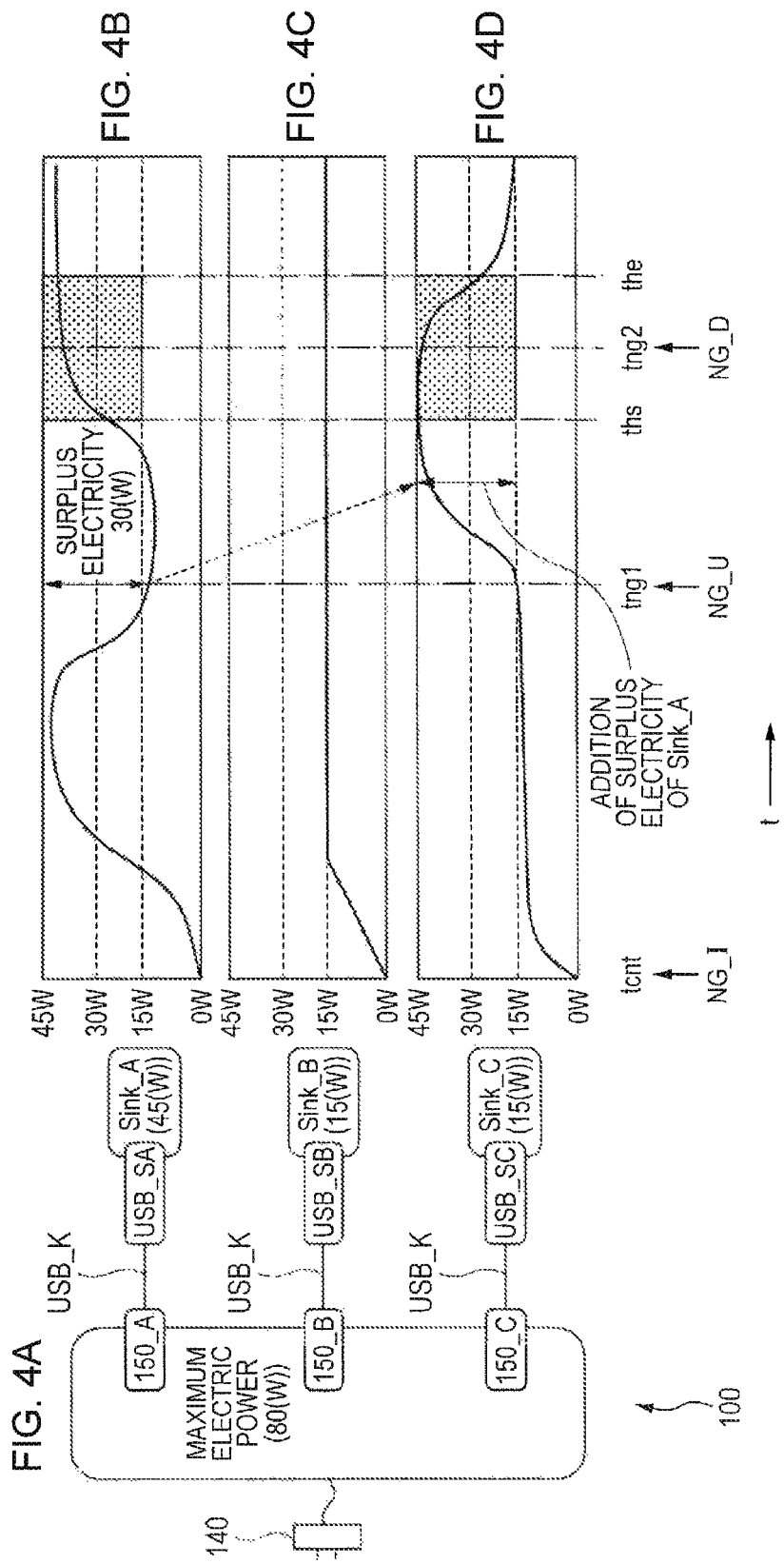
FIGS. 4A to 4D are diagrams for explaining the operation of the power supply system according to the second embodiment.

FIGS. 4A to 4D are diagrams for explaining the operation of the power supply system according to the second embodiment. FIG. 4A illustrates the configuration of the power supply system 100. Since the configuration of the power supply system 100 illustrated in FIG. 4A is the same as that of the power supply system illustrated in FIG. 3, the description will not be repeated. Like in FIG. 2A, in FIG. 4A, only the USB ports 150_A to 150_C of the power supply system 100 and the power supply plug 140 are illustrated. Since reference numerals Sink_A to Sink_C, USB_SA to USB_SC, and USB_K in FIG. 4A are the same as those in FIG. 2A, their description will not be repeated.

FIGS. 4B to 4D are waveform charts illustrating changes with time of the consumption powers of the power reception devices Sink_A to Sink_C. Although the waveforms of the consumption powers of the power reception devices Sink_A to Sink_C in FIGS. 4B to 4D are the same as those of the consumption powers illustrated in FIGS. 2B to 2D, reference numerals for describing the second embodiment are added in FIGS. 4B to 4D.

A case where the power reception device Sink_A has surplus power and the surplus power is allocated to the power reception device Sink_C in a manner similar to FIGS. 2A to 2D will be described as an example.

As described with reference to FIGS. 2A to 2D, by execution of the negotiation NG_U upon surplus supply between the manager 103 and the power reception device Sink_C, surplus power generated in the power reception device Sink_A is allocated to the power reception device Sink_C. It enables the power reception device Sink_C to execute a process requiring consumption power exceeding 15 (W). The negotiation NG_U upon surplus supply is executed between the manager 103 and the power reception device Sink_C but is not executed between the manager 103 and the power reception device Sink_A. Consequently, the power reception device Sink_A executes a process on assumption that the maximum power 45 (W) consented in the negotiation NG_I upon insertion is supplied. Therefore, the power reception device Sink_A executes a process in which consumption power is increased to consumption power corresponding to the consented maximum power 45 (W).

In the case where the power reception device Sink_A executes a process in which consumption power decreases and, after that, executes a process in which consumption power reaches the maximum power consented, as illustrated in FIG. 4B, the consumption power of the power reception device Sink_A increases again after time tng1. In this case, the manager 103 already consented to supply the maximum power 45 (W) to the power reception device Sink_C in the negotiation NG_U upon surplus supply. Consequently, when the consumption power of the power reception device Sink_A increases, a state that sump of the consumption powers of the power reception devices Sink_A and Sink_C exceeds the maximum power 80 (W) of the common power supply unit 130 occurs. When such a state occurs, the feeding voltage in the power supply terminals VBUS of the USB ports 150_A to 150_C decreases, and it becomes difficult to maintain the PD request voltage requested by the power reception device. As a result, there is the possibility that the operation of the power reception device becomes unstable or erroneous operation is caused.

In the embodiment, the capacitor 201 in the auxiliary power supply unit 200 is preliminarily charged by the common power supply unit 130, and sufficient charges are accumulated in the capacitor 201. The charges accumulated in the capacitor 201 function to temporarily compensate the consumption power exceeding the maximum power of the common power supply unit 130. In FIGS. 4B to 4D, the period between time "ths" and time "the", by the charges accumulated in the capacitor 201, the consumption power exceeding the maximum power of the common power supply unit 130 is compensated.

In the period between time "ths" and time "the", the manager 103 controls the power reception device Sink_C so that the sum of the consumption powers of the power reception devices Sink_A to Sink_C does not exceed the maximum power of the common power supply unit 130. In the embodiment, the manager 103 detects that, by the detection signal D_A expressing the consumption power of the power reception device Sink_A, the consumption power of the power reception device Sink_A increases. When the consumption power of the power reception device Sink_A becomes larger than a predetermined criterion, the manager 103 executes negotiation with the power reception device Sink_C. To discriminate the negotiation NG_I upon insertion and the negotiation NG_U upon surplus supply described above and a negotiation executed here, hereinbelow, the negotiation executed here will be called negotiation upon surplus stop (third negotiation) NG_D.

The negotiation NG_D upon surplus stop is a process similar to the negotiation NG_I upon insertion. However, different from the negotiation NG_I upon insertion, the manager 103 starts the negotiation NG_D upon surplus stop with the power reception device Sink_C to which surplus power is allocated due to the detection signal D_A expressing consumption power of the power reception device Sink_A. The manager 103 executes the negotiation NG_D upon surplus stop in a state where the PD request voltage (second voltage), not the first voltage, is supplied to the power reception device Sink_C.

In the negotiation NG_D upon surplus stop, like in the negotiation NG_I upon insertion, the manager 103 notifies the power reception device Sink_C of maximum power obtained by subtracting the sum (60 (W)) of the maximum powers consented to the power reception devices Sink_A and Sink_B from the maximum power of the common power supply unit 130. In response, the power reception device Sink_C also requests 45 (W) as the operation power like in the negotiation NG_I upon insertion. For the request, the manager 103 consents the maximum power of 15 (W) like in the negotiation NG_I upon insertion. The manager 103 performs a control to the PD controller 102_C so that the power supply unit 111_C continuously outputs the PD request voltage.

Since the maximum power is consented at 15 (W) by the negotiation NG_D upon surplus stop, the power reception device Sink_C changes the process so as to decrease the operation power. By the change, as illustrated in FIG. 4D, the consumption power of the power reception device Sink_C decreases after time tng2. As a result, the feeding voltage in the power supply terminals VBUS of the USB ports 150_A to 150_C can be prevented from becoming lower than the PD request voltage.

In the embodiment, when the consumption power of the power reception device Sink_A having surplus power increases again, the power supplied to the power reception device is compensated by the auxiliary power supply unit 200. In the period in which power is compensated by the auxiliary power supply unit 200, the negotiation NG_D upon surplus stop is executed between the power reception device Sink_C to which surplus power is allocated and the manager 103, and the maximum power consented to the power reception device Sink_C is decreased. As a result, the consumption power in the power reception device Sink_C decreases. Consequently, even the consumption power of the power reception device Sink_A increases, the feeding voltage in the power supply terminal VBUS of the USB port can be prevented from becoming lower than the PD request voltage.

Although the example of using the capacitor 201 as the auxiliary power supply unit 200 has been described, the invention is not limited to the example. For example, in place of the capacitor 201, a cell or a chargeable battery can be used as the auxiliary power supply unit 200. In the case of using a battery as the auxiliary power supply unit 200, the battery can be charged from the common power supply unit 130.

Third Embodiment

In the first and second embodiments, the criterion at the time of determining whether surplus power is generated or not is stored as data by the manager 103.

In a third embodiment, a processor performing the determination of whether surplus power is generated or not is added to the semiconductor device 101 for control. In this case, to the added processor, the detection signals D_A to D_N are supplied. When the consumption power expressed by the detection signals D_A to D_N is continuously lower than the consented maximum power by, for example, 30 (W) for a predetermined period, the processor determines that surplus power is generated. The determination result is notified to the manager 103. When a determination result that surplus power is generated is notified, the manager 103 executes the negotiation NG_U upon surplus supply described in the first and second embodiments.

For example, referring to FIGS. 2A to 2D, when the consumption power of the power reception device Sink_A coupled to the USB port 150_A having priority exceeds a preset criterion continuously for predetermined time, the added processor notifies the manager 103 of generation of surplus power as a determination result.

By the above, when the consumption power of the power reception device Sink_A fluctuates for short time, the surplus power is not allocated to the power reception device Sink_C. That is, when the difference power between the maximum power consented to the power reception device Sink_A and actual consumption power of the power reception device Sink_A is smaller than the criterion or the consumption power decreases for short time, it is regarded as a fluctuation of the consumption power and the power is not allocated. If the power is allocated for such fluctuation of the consumption power, the negotiation is executed frequently and the control may be complicated.

By providing the added processor with a register storing data of power as a criterion and a register storing data indicating the predetermined time, the criterion and the predetermined time can be changed according to a use.

Although the negotiation NG_U upon surplus supply has been described as an example, also with respect to the negotiation NG_D upon surplus stop, the consumption power of the power reception device Sink_A expressed by the detection signal D_A may be determined by the criterion and the predetermined time.

Obviously, the function of making the determination by using the predetermined time and the criterion may be employed in one of the case of the negotiation NG_U upon surplus supply and the case of the negotiation NG_D upon surplus stop. Although the case of using a processor different from the manager 103 has been described in the embodiment, the function of the processor may be realized by the manager 103.

Fourth Embodiment

In the third embodiment, the processor stores data indicating the criterion and, on the basis of consumption power expressed by a detection signal, determines whether surplus power is generated or not. In a fourth embodiment, whether surplus power is generated or not is determined on the basis of a past process executed between the power supply system 100 and the power reception devices Sink_A to Sink_N.

The power supply system 100 has the process unit 104 as illustrated in FIG. 1. The process unit 104 is coupled to data transmission terminals TX1+, TX1−, TX2+, and TX2− and data reception terminals RX1+, RX1−, RX2+, and RX2− (refer to FIG. 6) in the USB port 150_A.

On the other hand, the USB port USB_SA of the power reception device Sink_A coupled to the USB port 150_A via the USB cable USB_K has the data transmission terminals TX1+, TX1−, TX2+, and TX2− and the data reception terminals RX1+, RX1−, RX2+, and RX2− as illustrated in FIG. 6. In this case, the data reception terminals in the USB port 150_A are coupled to the data transmission terminals of the power reception device Sink_A, and the data transmission terminals in the USB port 150_A are coupled to the data reception terminals of the power reception device Sink_A by the USB cable USB_K.

Figure 5:
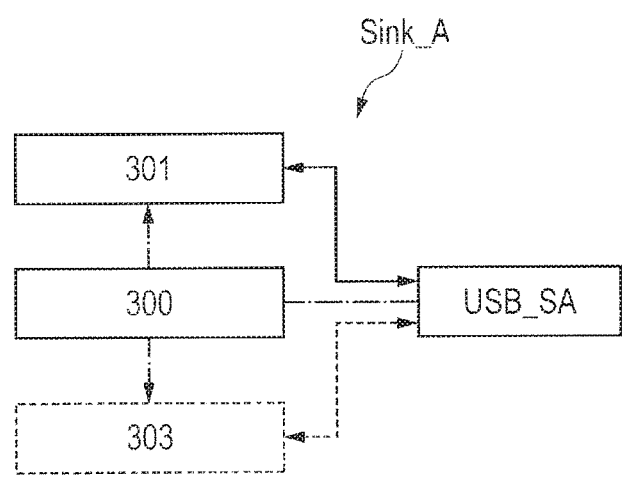
FIG. 5 is a block diagram illustrating the configuration of a power reception device according to a fourth embodiment.

Next, a configuration example of the power reception device Sink_A will be described. FIG. 5 is a block diagram illustrating the configuration of a power reception device according to the fourth embodiment. The power reception device Sink_A has a USB port USB_SA, a power reception unit 300, a PD controller 301, and a process unit 303.

The power reception unit 300 is coupled to the power supply terminal VBUS of the USB port USB_SA and supplies a PD request voltage supplied to the power supply terminal VBUS as the operation voltage of the PD controller 301 and the process unit 303 to the PD controller 301 and the process unit 303. The PD controller 301 is coupled to the channel terminals CC1 and CC2 of the USB port USB_SA and, at the time of USBPD communication, performs communication with the PD controller 102_A in the power supply system 100. For example, at the time of negotiation, the operation power of the power reception device Sink_A is notified to the power supply system 100, and consented maximum power is notified from the power supply system 100. The PD controller 301 notifies the notified maximum power to the process unit 303. The process unit 303 operates so as not to exceed the notified maximum power.

The process unit 303 is coupled to the data transmission terminals TX1+, TX1−, TX2+, and TX2− and the data reception terminals RX1+, RX1−, RX2+, and RX2− of the USB port USB_SA. When the data transmission terminals and the data reception terminals of the USB port USB_SA and the data reception terminals and the data transmission terminals of the USB port 150_A are electrically coupled via the USB cables USB_K, data is transmitted/received (RX/TX) between the process unit 104 in the power supply system 100 and the process unit 303 in the power reception device Sink_A, and a process of realizing a predetermined function is executed by cooperation of the process units 104 and 303.

The processor added in the fourth embodiment obtains generates a record of process executed by the cooperation of the process units 104 and 303 and process of obtaining consumption power of the power reception device Sink_A when the process is executed and consumption power. The processor learns a process of generating a timing at which the consumption power of the power reception device Sink_A becomes small on the basis of the generated record. By learning, a process which generates surplus power can be specified. When a process specified by the learning is executed, the processor makes the manager 103 execute the negotiation NG_U upon surplus supply.

The process executed by cooperation of the process units 104 and 303 can be grasped as, for example, an operation pattern of the process unit 303 based on data transmitted/received between the process units 104 and 303. In this case, the processor obtains the operation pattern of the process unit 303 and the consumption power of the power reception device Sink_A, generates a record, and learns so as to specify an operation pattern corresponding to a timing at which the consumption power of the power reception device Sink_A becomes small. When the operation pattern of the process unit 303 specified by the learning is generated, the processor makes the manager 103 execute the negotiation NG_U upon surplus supply.

Further, since data transmission/reception between the process units 104 and 303 is USB communication, for example, the processor may monitor the state (U0, U1, U3, or the like) of the USB communication, the amount of data transmitted/received, a packet type at the time of communication, and the like, store, as a record, the correspondence between a data pattern of transmission/reception data obtained by the monitoring and the consumption power of the power reception device Sink_A, and learn a data pattern corresponding to the timing at which the consumption power of the reception device Sink_A becomes small. In this case as well, by the learning, a data pattern corresponding to a timing at which the consumption power of the power reception device Sink_A decreases is specified. When a data pattern specified by learning appears, the processor makes the manager 103 execute the negotiation NG_U upon surplus supply.

At the time of generating a record, the consumption power of the power reception device Sink_A can be obtained by the detection signal D_A. Consequently, while operating the power supply system 100, the above-described learning can be executed. However, if the learning is finished, it is unnecessary to measure the consumption power of the power reception device Sink_A. Consequently, by storing a result preliminarily learned into the processor, the ammeter 120_A is not necessary. It can suppress increase in the size of the power supply system 100.

Although the USB ports 150_A and USB_SA have been described as an example, when a process unit similar to the process unit 104 is coupled to other USB ports (for example, 150_B and USB_SB), the processor can similarly learn and specify a timing at which surplus power is generated and notify the specified timing to the manager 103. In this case, the processor specifies a power reception device in which consumption power decreases by identification information ID specifying each power reception device and notifies the specified power reception device to the manager 103. The manager 103 executes the negotiation NG_U upon surplus supply, for example, with a power reception device coupled to a USB port other than the USB port electrically coupled to the notified power reception device.

Since the period in which surplus power is generated can be specified by learning, the power distribution can be realized more efficiently. Since the ammeters 120_A to 120_N can be also removed, the power supply system 100 can be miniaturized.

Although it has been described that the timing at which surplus power is generated is obtained by learning, the invention is not limited to the case. Specifically, a timing at which surplus power decreases may be obtained by learning. In this case, the processor notifies the timing obtained by learning to the manager 103, and the manager 103 executes the negotiation NG_D upon surplus stop.

Although an example of forming a plurality of PD controllers and a manager in the single semiconductor device 101 for control and forming a plurality of power supply units in the single semiconductor device 110 for power is illustrated in FIGS. 1 and 3, the present invention is not limited to the example. For example, the plurality of PD controllers and the processor may be formed in different semiconductor devices. The plurality of PD controllers may be formed in different semiconductor devices. Further, the power supply units may be also formed in different semiconductor devices.

Although the present invention achieved by the inventors herein have been concretely described on the basis of the embodiments above, obviously, the present invention is not limited to the embodiments but can be variously changed without departing from the gist.

What is claimed is:

1. A power supply system conformed to a USBPD standard, the power supply system comprising:
   a plurality of USB ports including a first USB port and a second USB port;
   a common power supply that is common to the plurality of USB ports;
   a plurality of power supplies corresponding to the plurality of USB ports, the plurality of power supplies being coupled to the corresponding USB ports and the common power supply, the plurality of power supplies supplying power to the corresponding USB ports from the common power supply;
   a plurality of controllers corresponding to the plurality of USB ports and each coupled to a corresponding USB port and a corresponding power supply;
   a processor executing allocation of maximum power to be assigned to the plurality of USB ports in accordance with signals from the plurality of controllers; and
   a detector corresponding to the plurality of USB ports, the detector outputting a plurality of detection signals indicating consumption powers consumed in corresponding USB ports, wherein when a third USB port of a first power reception device and a fourth USB port of a second power reception device are respectively coupled to the first USB port and the second USB port, the processor executes a first negotiation of allocating the maximum power between the first power reception device and the second power reception device, wherein when maximum power assigned to the first USB port has surplus power for consumption power in the first USB port, the processor executes a second negotiation of allocating the maximum power between the first power reception device and the second power reception device such that maximum power assigned to the second USB port includes the surplus power, wherein the processor executes a third negotiation of allocating the maximum power between the first power reception device and the second power reception device such that the maximum power assigned to the second USB port decreases during a period in which the consumption power in the first USB port increases and an auxiliary power supply coupled to the common power supply supplies auxiliary power, and wherein the maximum power assigned to the second USB port by execution of the third negotiation is equal to the maximum power assigned to the second USB port by execution of the first negotiation.

2. The power supply system according to claim 1, wherein the processor determines whether the surplus power is generated or not by detecting the consumption power consumed in the first USB port based on a detection signal corresponding to the first USB port and comparing maximum power assigned to the first USB port and the detected consumption power.

3. The power supply system according to claim 2, further comprising a microprocessor determining whether surplus power is generated or not.

4. The power supply system according to claim 1, wherein whether the surplus power is generated or not is determined based on record of the consumption power consumed in the first USB port.

5. The power supply system according to claim 1, wherein the third USB port and the fourth USB port conform to the USBPD standard.

6. The power supply system according to claim 1, wherein the first to fourth USB ports have a terminal layout conformed to a USB type-C.

7. The power supply system according to claim 1, wherein the detector has a plurality of ammeters coupled between the plurality of power supplies and the common power supply unit, the detector outputs current measured by the ammeters as the detection signal, wherein the auxiliary power supply has a capacitor or a chargeable battery coupled in parallel to the common power supply, and wherein the capacitor or the battery is charged by the common power supply.

8. A semiconductor device used in a power supply system allocating power from a common power supply to a first USB port and a second USB port, the semiconductor comprising:

a processor to which a plurality of detection signals according to consumption powers consumed in the first USB port and the second USB port is supplied; and a first controller corresponding to the first USB port, the first controller performing control to supply power from the common power supply to the first USB port in accordance with the detection signals supplied to the processor; and a second controller corresponding to the second USB port, the second controller performing control to supply power from the common power supply to the second USB port in accordance with the detection signals supplied to the processor, wherein when a third USB ports of a first power reception device and a fourth USB port of a second power reception device are respectively coupled to the first USB port and the second USB port, the processor executes a first negotiation of allocating the maximum power between the first power reception device and the second power reception device, wherein when maximum power assigned to the first USB port has surplus power for consumption power in the first USB port, the processor executes a second negotiation of allocating the maximum power between the first power reception device and the second power reception device such that maximum power to which the surplus power is added is assigned to the second USB port, wherein the processor executes a third negotiation of allocating the maximum power between the first power reception device and the second power reception device such that the maximum power assigned to the second USB port decreases during a period in which the consumption power in the first USB port increases and an auxiliary power supply coupled to the common power supply supplies auxiliary power, and wherein the maximum power assigned to the second USB port by execution of the third negotiation is equal to the maximum power assigned to the second USB port by execution of the first negotiation.

9. The semiconductor device according to claim 8, wherein the third USB port and the fourth USB port conform to a USBPD standard.

* * * * *